United States Patent

Ban

[15] 3,684,840

[45] Aug. 15, 1972

[54] MAGNETIC TAPE RECORDING AND REPRODUCING APPARATUS USING A SMALL CYCLE TIME ENDLESS TAPE WITH MOVABLE HEAD FOR REPLAY

[72] Inventor: Itsuki Ban, 829, Higashi-Oizumimachi, Nerima-ku, Tokyo, Japan

[22] Filed: April 14, 1971

[21] Appl. No.: 133,860

[52] U.S. Cl....179/100.2 CA, 35/35 C, 179/100.2 Z, 274/4 C

[51] Int. Cl.........................G11b 21/08, G11b 23/04

[58] Field of Search.....179/100.2 Z, 100.2 CA, 100.2 MD; 274/4 C, 4 A, 4 E; 35/35 C, 35 G; 242/55.19 A

[56] References Cited

UNITED STATES PATENTS

| | | | |
|---|---|---|---|
| 3,424,872 | 1/1969 | Whitlock et al. | 35/35 C |
| 3,539,191 | 11/1970 | Yamamoto | 179/100.2 CA |
| 3,538,779 | 11/1970 | Yamamoto | 179/100.2 CA |
| 3,624,309 | 11/1971 | Dattilo | 179/100.2 CA |

*Primary Examiner*—Bernard Konick
*Assistant Examiner*—Alfred H. Eddleman
*Attorney*—Jacobs & Jacobs

[57] ABSTRACT

A magnetic tape recording and reproducing apparatus which comprises an endless magnetic tape of little re-cycle time, a driving means for the tape, a recording and reproducing circuit with a magnetic head for recording and reproducing the tape, a rotary cam for vertically moving the magnetic head transversely of the tape, a first cam driving means for continuously rotating the cam as the tape is transported, and a second cam driving means for steppedly rotating the cam in the direction opposite to the direction that the cam is rotated by the first cam driving means, and wherein a spiral recording track is continuously formed, the magnetic head being intermittently moved as the cam is rotated by the second driving means thereby reproducing the recorded information upon returning back for the period multiple of integral number of the re-cycle time of the tape.

5 Claims, 7 Drawing Figures

MAGNETIC TAPE RECORDING AND REPRODUCING APPARATUS USING A SMALL CYCLE TIME ENDLESS TAPE WITH MOVABLE HEAD FOR REPLAY

BACKGROUND OF THE INVENTION

This invention relates to a magnetic tape recording and reproducing apparatus, and more particularly to a magnetic tape recording and reproducing apparatus of the type designed capable of immediately reproducing the recorded external information upon returning back for the period as indexed or designated.

The magnetic tape recording and reproducing apparatus is used as a teaching machine by which lessons in music or conversation are improved upon recording and reproducing the acoustic informations to confirm effect of such the practice. The magnetic tape recording and reproducing apparatus used for that purposes is required to provide such function that the recorded information can be reproduced immediately after recording. Disadvantage of a conventional apparatus is in that although the recorded information can be reproduced by wind back the tape, it cannot be heard for the period when the magnetic tape is wound back. The recorded information immediately after recording, cannot be reproduced unless the recording is suspended and the magnetic tape is wound back to change over to the reproducing after winding back. This requires much trouble. Due to difficulty involved in winding back the tape at predetermined volume, it is impossible to reproduce the recorded portion as desired, and undesired recorded portion may be reproduced or the desired recorded portion may not be reproduced.

Many attempts have been heretofore made to provide an apparatus to obtain the above mentioned purpose, however, none of them could give a satisfactory result.

According to the present invention, the recorded external information can be reproduced immediately upon returning back for the period as indexed so that effect of one's practice may be readily confirmed.

SUMMARY OF THE INVENTION

It is, therefore, a primary object of the invention to provide a magnetic tape recording and reproducing apparatus which is capable of immediately reproducing the recorded external information upon returning back for the period as indexed or designated.

Another object of the invention is to provide a magnetic tape recording and reproducing apparatus wherein an endless magnetic tape of little re-cycle time (time for one cycle) and wherein a spiral recording track is formed on the tape by vertically moving a magnetic head transversely of the width of the tape for recording and reproducing the tape as the tape is transported.

A further object of the invention is to provide an apparatus of the above class which is capable of immediately reproducing the recorded external information upon steppedly and vertically moving the magnetic head and returning back for the period multiple of integral number of the re-cycle time of the tape.

For a fuller understanding of the nature and objects of the invention, reference should be had to the following detailed description taken in conjunction with the accompanying drawings wherein;

DESCRIPTION OF THE PREFERRED EMBODIMENTS

Figure 1:
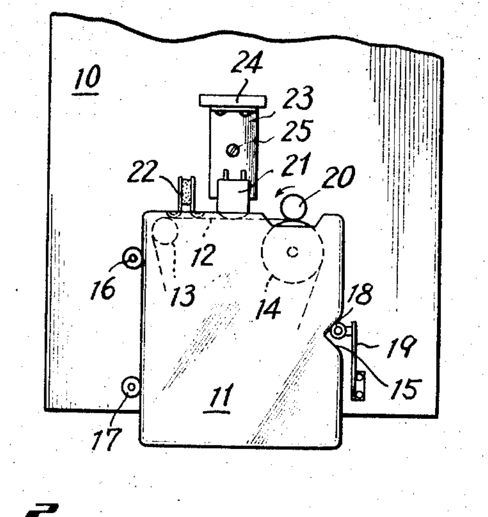
FIG. 1 is a plan view of a magnetic tape recording and reproducing apparatus according to the present invention.

Referring now to the drawings, and in particularly to FIG. 1, the reference numeral 10 designates a horizontal player deck within a housing (not shown) for a magnetic recording and reproducing apparatus. Mounted on the deck 10 are guide members 16, 17 and 18 for providing a way for a tape cartridge 11 and holding it in an operative position. The guide member or retention member 18 is mounted to a leaf spring 19 one end of which is firmly mounted to the deck 10, and is pressed against a notch 15 on the side of the cartridge 11. By pressure of the retention roller 18 against the inclined wall of the notch 15 in the cartridge 11, a forward force is exerted on the cartridge 11 to place it in the operative position with respect to a magnetic head 20 and a rotatary capstan 21. Built in the cartridge 11 are an endless magnetic tape 12, a tape guide 13, and a pinch roller 14. The tape 12 is in a relatively small loop form at re-cycle time of 10 seconds (when travelled as measured by one cycle time).

The capstan 20 is rotatably mounted on a suitable bearing (not shown) downwardly of the deck 10 and extend through a hole (not shown) bored through the deck upwardly of the deck. The capstan 20 is also adapted to be rotatably driven by an electrical motor (not shown) provided downwardly of the deck. The capstan 20 is adapted to cooperate with the pinch roller 14 of the cartridge 11 when the cartridge is urged into its operative position. The tape 12 which is driven by the capstan 20 and the pinch roller 14 may run across an endmark detector 22 and the head 21.

The magnetic head 21 is adapted to vertically move along the tape 12 and traverse it by a head shifting means as will be described later. The magnetic head 21 is firmly secured to a displaceable support member 23 made of a leaf spring of which one end portion is fixed to a stable member 24 on the deck 10.

Figure 2:
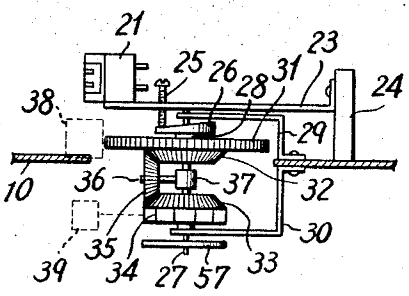
FIG. 2 is an elevational side view showing a magnetic shifting mechanism for the apparatus in FIG. 1.
Figure 3:
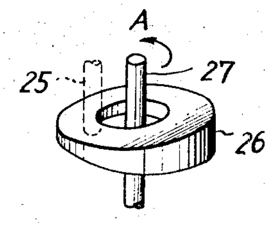
FIG. 3 is a perspective view of a rotary cam shown in FIG. 2.

The details of the head shifting means will be readily understood from the following description when referred to FIG. 2. A threaded pin 25 is held in a threaded aperture (not shown) of the support member 23. The rounded bottom end of the threaded pin 25 is arranged to ride on a face cam 26. A downward bias force is inherent in the displaceable support member 23 to maintain the pin 25 and the cam 26 in an operative relation. The cam 26 is exaggeratedly shown in FIG. 3 includes a cam surface which forms a slope through full extent. The cam 26 is secured by a sleeve 28 to an axis 27 rotatably supported by frames 29, 30. The axis 27 loosely carries a gear 31 integrally formed with a first bevel gear 32 and a ratchet wheel 34 integrally formed with a second bevel gear 33. A third bevel gear 35 is provided between the first bevel gear 32 and the second bevel gear 33 and differentially meshes therewith. The third bevel gear 35 is rotatably supported by a shaft 36 one end of which is fixed by a connecting member 37 to the axis 27. The gear 31 is connected through a reducing gearing 38 represented by the dash line shown in FIG. 2 to the capstan 20 and is rotatably driven thereby as power source. The reduction ratio of the reducing gearing 38 is so determined that the gear 31 is rotated through a turn about its axis at 40 seconds if the re-cycle time of the tape 12 is 10 seconds. When the first gear 32 is rotated with the gear 31, the third bevel gear 35 is rotated about its shaft 36 while pivotting about the axis 27. Pivotal movement of the third bevel gear 35 rotates the cam 26 with the axis 27 in the direction of arrow A shown in FIG. 3. The reduction ratio of the first bevel gear 32 and the third bevel gear 35 is so determined that the axis 27 is rotated through a half turn when the first bevel gear 32 is rotated through a turn. From this it is apparent that if the re-cycle time of the tape 12 is 10 seconds the cam 26 is rotated through a turn at 80 seconds. Rotation of the cam 26 vertically moves the head 21 through the pin 25 and the support member 23. Vertical movement of the head 21 forms a spiral magnetic track on the tape 12, as will be fully described later.

The ratchet 34 is advancedly and rotatably driven by a driving mechanism represented by a dash line.

Figure 4:
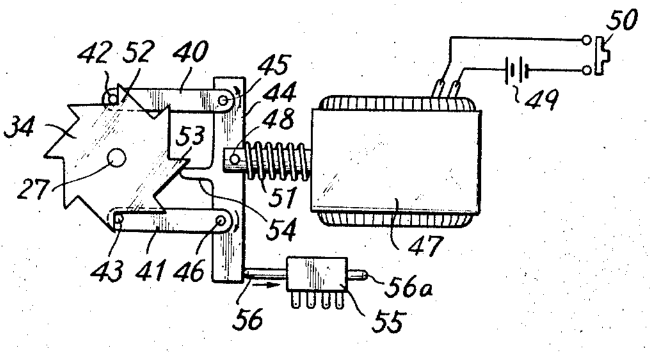
FIG. 4 is a plan view of a second cam driving means for rotatably driving the rotary cam shown in FIG. 2.

FIG. 4 shows the details of the driving mechanism in which similar numerals are used to illustrate like parts in FIG. 2. The ratchet 34 includes eight gear teeth. Reciprocating levers 40, 41 are provided in relation to the ratchet 34, and pins 42, 43 mounted on the levers 40, 41 mesh with the two teeth. The reciprocating levers 40, 41 are pivotally mounted to the lever 44 by axes 45, 46 mounted to the end portions of a lever 44 and are urged respectively by a spring (not shown) in the direction of the arrow as shown. The lever 44 is fixed to an armature 48 of a solenoid 47. The solenoid 47 is connected through a normal opened push button-switch 50 to an electrical source 49. Manual closing the switch 50 causes the source 49 to energize the solenoid 47 thereby attractively moving the armature 47 against the bias of a compressive spring 51. Movement of the armature 48 moves the reciprocating levers 40, 41 to cause the pin 42 engaged with the tooth 52 to move the ratchet wheel 34 through 45° as in this example. In response to release of depressure on the switch 50, the solenoid 47 is deenergized to return the armature 48 and the reciprocating levers 40, 41 to their initial positions by the bias of the spring 51. When the reciprocating levers 40, 41, the pin 43 engageable with the tooth 53 further rotates the ratchet 34 through 45° as in this instance, that is, the ratchet 34 is steppedly rotated whenever the solenoid 47 is energized. A projecting portion 54 of the lever 44 is adapted to abut against the ratchet 34 as shown and prevents the ratchet 34 from overrunning when rotation of the ratchet 34 is terminated. Numeral 55 designates a changing slide switch which includes a manually operated actuator 56 and the lever. The actuator 56 is slided in the direction of the arrow as shown by depressure of the lever 44 while the switch as will be detailed later, is changed over to place an electric circuit for the magnetic recording and reproducing apparatus in a reproducing condition. Where the solenoid 55 is deenergized, if one end 56*a* of the actuator 56 is manually depressed to slide the actuator 56 into the position as shown, the switch 55 is changed over to cause the electric to convert from the reproducing condition into the recording condition.

Now, referring back to FIG. 2, the second bevel gear 33 is rotated with the ratchet 34 when the latter is rotated by the driving mechanism 39. Rotation of the second bevel gear 33 rotates the third bevel gear 35 about the shaft 36 while pivotting about the axis 27. Pivotal movement of the third bevel gear 35 rotates the cam 26 with the axis 27. The reduction ratio of the second bevel gear 33 and the third bevel gear 35 are so determined that the axis 27 is rotated through a half turn when the second bevel gear 33 is rotated through a turn. As previously mentioned, the cam is steppedly rotated at angle of 45° whenever the ratchet 34 is steppedly rotated through 90° by means of the driving mechanism 39.

Figure 5:
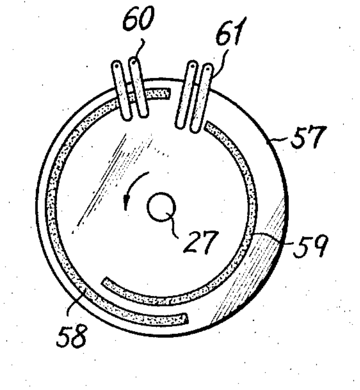
FIG. 5 is a plan view of a rotary switch operable in response to rotation of the cam.

Tightly mounted to the axis 27 is an insultion rotary disk 57 of a rotary switch as will fully illustrated in FIG. 5. A pair of semi-circular conductive pieces 58, 59 are provided on the rotary disk 57 at its surface. The conductive pieces are disposed in a relationship with each other, as shown in FIG. 5, on the rotary disk 57 at its surface. Switches 60 and 61 each consisting of a pair of contacts are mounted on a fixed member (not shown) of insulation, which is provided corresponding to the rotary disk 57. A pair of contacts of the switch 60 are adapted to be shorted by the conductive piece 58 while a pair of contacts of the switch of the switch 61 is also adapted to be shorted by the conductive piece 59. The switches 60 and 61 are arranged so that the switch 61 is normally opened when the switch 60 is closed by the conductive piece 58 while the switch 61 is normally closed by the conductive piece 59 when the switch is opened. A change-over operation from closing to opening of the switches 60 and 61 is made whenever the rotary disk is rotated through a half turn. If the period when such a change of the switches 60 and 61 from closing to opening is short, the switches 60, 61 may be simultaneously closed.

An electric circuit for the magnetic tape recording and reproducing apparatus according to the present invention will be described hereinafter in conjunction with FIG. 6. Similar numerals are used to illustrate like parts in FIGS. 4 and 5.

The magnetic head 21 (FIGS. 1 and 2) is of a stereo-head and includes a pair of transduce or pick-up elements as indicated by numerals 62, 63 and a pair of erasing elements (not shown). The transduce or pick-up elements 62, 63 are vertically spaced a distance half of the width of the tape 12 (FIG. 1).

The external or foreign signals such as music, voice, sound or the like to be recorded on the tape is converted by a microphone or the like (not shown) into an electrical signal and then is applied to an input terminal 64 thereby. The signal applied to the input terminal 64 is amplified by a pre-amplifier 65, and a recording amplifier 66 and is then applied by the switch 55 (FIG. 6 shows it is set to the recording condition) and the switch 60 to the first transduce or pick-up element 62 upwardly arranged. The erasing current from an eraser (not shown) which needs no description due to little important for understanding the invention, is adapted to be applied to one erasing element (not shown) arranged as the same level as the transduce or pick-up element 62 when the switch 55 is set to the recording condition and the switch 60 is closed. Therefore, after a recorded track on the tape 12 corresponding to the transduce or pick-up element 62 has been erased by the erasing element (not shown), the signal to be applied to the input terminal 64 is recorded by the transduce or pick-up element 62. As previously stated, since the head shifting mechanism is arranged so that the cam 26 (FIG. 2 and 3) is rotated through a half turn when the tape 12 makes four cycles, the head 21 is gradually raised as the cam 26 is rotated during four cycles of the tape 12. For this reason, a continuous spiral recording track is formed on the tape 12 by the transduce or pick-up element 62. Portions of the recording track are shown designated at 67 to 71 in FIG. 7. The head 21 is gradually lowered with rotation of the cam 26 as the cam 26 is rotated through more than a half turn. On the other hand, due to action of the rotary switch (FIG. 5), the switch 60 is opened while the switch 61 is closed. Accordingly, a continuous spiral recording track is formed on the tape 12 by the lower second transduce or pick-up element 63. Portions of the recording track are shown indicated at 72 to 76 in FIG. 7. In other words, the recording tracks 67 to 71 in a continuous spiral form are formed by the first transduce or pick-up element 62 until the tape 12 is transported and makes four cycles whereas the recording tracks 72 to 76 in a continuous spiral form are formed by the first transduce or pick-up element 62 until the tape 12 is transported and makes four cycles whereas the recording tracks 72 to 76 in a continuous spiral form are formed by the second transduce or pick-up element 63 until the tape makes five cycles to eight cycles. In an area B in FIG. 7, a portion each of the tracks 71 and 72 and a portion each of the tracks 76 and 67 are overlappedly recorded because that there is the time when the switches 60 and 61 are simultaneously closed as set forth hereinbefore. As a result, eight recording tracks are substantially and continuously formed on the tape 12. In view thereof, an endless recording loop of 80 seconds is formed if the re-cycle time of the tape is 10 seconds. The erasing current from the eraser (not shown) which needs no description due to little important for understanding the invention, is adapted to be applied to the other erasing element (not shown) arranged as the same level as the transduce or pick-up element 63. A rotary switch (not shown) similar to the rotary switch shown in FIG. 5 is provided between a pair of the erasing element (not shown) and the eraser (not shown).

Figure 6:
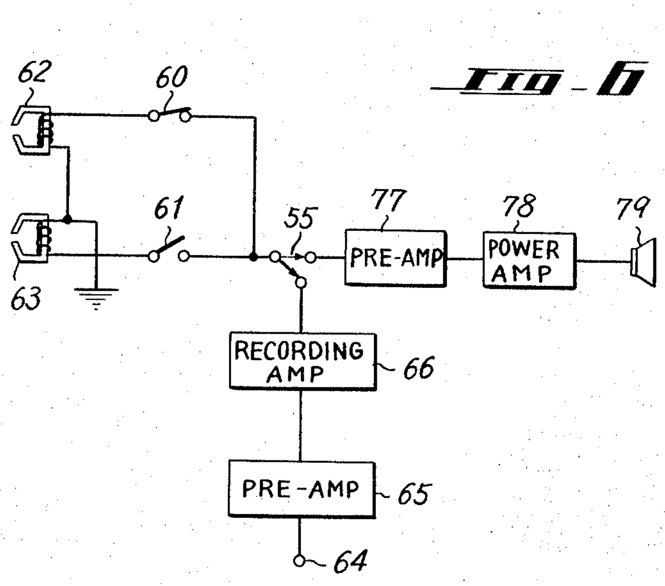
FIG. 6 is a schematic representation of a recording and reproducing circuit for the apparatus according to the present invention.
Figure 7:
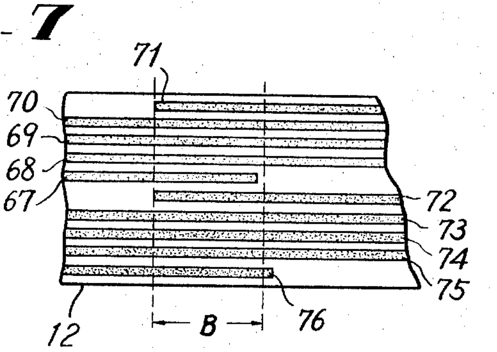
FIG. 7 is a representation explanatory of the recording track formed by the apparatus of the present invention on the tape.

Upon depressure on the push button-switch 50, the actuator 56 for the switch 55 is operated in response to activation of the solenoid 47 and the switch 55 is changed over to the position as indicated by the dot line in FIG. 6. An electrical circuit is arranged so that a connection between the eraser (not shown) and the erasing element (not shown) is cut off by means of a switch (not shown) operable in association with the switch 55 at that moment. The electrical circuit is changed over from the recording condition to the reproducing condition by changing the switch 55 in response to operation of the solenoid 47.

Now, the push button-switch 50 is depressed in times, the ratchet wheel 34 is steppedly rotated through $n \times 90°$ so that the cam 26 is also rotated through $n \times 45°$ to move the head 21 to the position corresponding to the track preceded by $n$ steps ($n$ 8). When the switch 60 is closed, the output of the transduce or pick-up element 62 is applied through the switch 55 to a pre-amplifier 77. The output of the pre-amplifier 77 is applied to a power amplifier 78 which drives a speaker 79. Accordingly, the signal which is picked up by the transduce or pick-up element 62 and recorded on the tape 12, is made out of the speaker as audible signal. On the other hand, the signal which is picked up by the transduce or pick-up element 63 and recorded on the tape 12, is made out through the switch 61, the switch 55, the pre-amplifier 77, the power amplifier 78 of the speaker 79 as audible signal.

As described, if the push button-switch 50 is depressed n times, the head 21 is moved to the position corresponding to the track preceded by n steps so that the reproducing sound is made out of the speaker 79 retroactively for the period of $n \times 10$ sec. where the re-cycle time of the tape is 10 seconds.

As fully described hereinbefore, by pressure on the push button-switch 50 as many times as desired, the magnetic tape recording and reproducing apparatus is capable of listen to the previous information upon retroactively backing for the desired period. This eliminates necessity to wind back the tape to listen to the previous information as in the manner of a conventional apparatus. A dial may be used instead of the push button-switch to operate the solenoid 47 in pulse fashion by a number of time as desired. It will be understood that if the rotational speed of the capstan 20 is suitably varied, the re-cycle time of the tape may be set to any period other than 10 seconds.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A magnetic tape recording and reproducing apparatus comprising:
- an endless magnetic tape of little re-cycle time;
- a tape driving means for drivingly transporting the magnetic tape;
- a magnetic head provided so as to contact the tape and movable transversely of the width of the tape, said magnetic head including first and second transduce or pick-up elements vertically disposed at a distance half of the width of the tape, and first and erasing elements; a
- a recording and reproducing circuit for applying a recording signal to the first and second transduce or pick-up elements and the erasing signal to the first and second erasing elements and for converting the output signal of the first and second transduce or pick-up elements into an audible signal;

a changing switch for selectively changing over the recording and reproducing circuit to the recording condition or the reproducing condition;

a rotary cam for vertically moving the magnetic head transversely of the width of the tape, said cam having a cam surface of gentle slope, said magnetic head being vertically moved in succession under influence of said cam surface when the cam is rotated through a turn;

a first cam driving means for continuously rotating the cam as the tape is transported and for rotating the cam through a predetermined angle when the tape makes one cycle, said first cam driving means being connected to the tape driving means and operated in relation to operation of the tape driving means;

a second cam driving means for steppedly rotating the cam in the direction opposite to the direction that said cam is rotated by the first cam driving means, said second cam driving means including a solenoid with a plunger reciprocable when the solenoid is energized, and a control switch for controlling the current supply to the solenoid, whenever said solenoid is energized in relation to operation of said control switch the cam being stepped rotated in relation to reciprocal movement of the plunger by the angle corresponding to the predetermined angle that the cam is rotated by the first cam driving means when the tape makes one cycle, the changing switch being adapted to be changed from the recording condition to the reproducing condition in response to operation of said second cam driving means;

a rotary switch for selectively connecting the first transduce or pick-up element of the magnetic head to the recording and reproducing circuit during a half turn of the cam or connecting the second transduce or pick-up element of the magnetic head to the recording and reproducing circuit during from a half turn to one turn of the cam, said rotary switch being adapted to be operated in relation to rotation of the cam; a spiral recording track being formed on the half portion of the tape by the first transduce or pick-up element during a half turn of the cam when the changing switch is in the recording condition while another spiral recording track being formed on the remainder of the tape by the second transduce or pick-up element during another half turn of the cam, the control switch being controlled to operate the second driving means so that the changing switch is changed to the reproducing condition to move the magnetic head reversedly by one step whereby the tape is reproduced upon retroactively going back for one cycle time, the second cam driving means being operated in a plurality of times by the control switch so that the magnetic head is reversedly moved by the steps corresponding to those times when the tape is reproduced upon retroactively going back for the period corresponding to the product of one cycle time of the tape and those times.

2. A magnetic tape recording and reproducing apparatus in accordance with claim 1, wherein said magnetic tape is received in a cartridge.

3. A magnetic tape recording and reproducing apparatus in accordance with claim 1, wherein said first cam driving means includes a first bevel gear operable by said tape driving means as a power source while said second cam driving means includes a second bevel gear rotatable in relation to operation of the solenoid, said first and second bevel gears being differentially engaged with a third bevel gear connected an axis to which said rotary cam is pivoted.

4. A magnetic tape recording and reproducing apparatus in accordance with claim 3, wherein said second cam driving means is integrally formed with said second bevel gear and includes a ratchet wheel intermittently rotatable in relation to reciprocal movement of said plunger of said solenoid.

5. A magnetic tape recording and reproducing apparatus in accordance with claim 1, wherein said first cam driving means is arranged so that it rotates said cam through a turn when said magnetic tape makes eight cycles while said second cam driving means is arranged so that it rotates the cam by 45° when said solenoid is operated.

* * * * *